(12) United States Patent
Ono

(10) Patent No.: US 10,486,340 B2
(45) Date of Patent: Nov. 26, 2019

(54) DEVICE FOR TURNING OVER MOLDS

(71) Applicant: SINTOKOGIO, LTD., Aichi (JP)

(72) Inventor: Yasushi Ono, Aichi (JP)

(73) Assignee: SINTOKOGIO, LTD., Aichi (JP)

( * ) Notice: Subject to any disclaimer, the term of this patent is extended or adjusted under 35 U.S.C. 154(b) by 118 days.

(21) Appl. No.: 15/575,106

(22) PCT Filed: May 25, 2016

(86) PCT No.: PCT/JP2016/065397
§ 371 (c)(1),
(2) Date: Nov. 17, 2017

(87) PCT Pub. No.: WO2017/018040
PCT Pub. Date: Feb. 2, 2017

(65) Prior Publication Data
US 2018/0154554 A1    Jun. 7, 2018

(30) Foreign Application Priority Data

Jul. 28, 2015 (JP) ................................. 2015-148727

(51) Int. Cl.
*B29C 33/34* (2006.01)
*B22C 23/00* (2006.01)
(Continued)

(52) U.S. Cl.
CPC .............. *B29C 33/34* (2013.01); *B22C 17/08* (2013.01); *B22C 23/00* (2013.01); *B29C 31/006* (2013.01)

(58) Field of Classification Search
CPC ......... B22C 17/08; B22C 17/10; B22C 17/12; B22C 17/14
(Continued)

(56) References Cited

U.S. PATENT DOCUMENTS 3,114,332 A * 12/1963 Bacon ................... A63G 21/06
104/168

FOREIGN PATENT DOCUMENTS

CN        2845960 Y    12/2006
CN      102019364 A     4/2011
(Continued)

OTHER PUBLICATIONS

Althoff, David, How Roller Coaster Cars Work (or don't), Oct. 10, 2015, https://web.archive.org/web/20151010051122/http://www.davealthoff.com/tech/coastercar.html (Year: 2015).*
(Continued)

*Primary Examiner* — Joseph S Del Sole
*Assistant Examiner* — Nicholas J Chidiac
(74) *Attorney, Agent, or Firm* — Finnegan, Henderson, Farabow, Garrett & Dunner, LLP

(57) ABSTRACT

A device for turning over molds is provided that can reduce the wear of turning over wheels and supporting rollers even when the speed for transporting a flask or the speed for turning it over increases. A pair of turning over wheels (5) are attached to respective sides of a turning over roller conveyor (4), on which a metal flask (3) is mounted. The outer surfaces of the wheels are supported by respective pairs of supporting rollers (6). A driving roller (9) is provided on one or both of the wheels. The supporting rollers are flangeless. Two pairs of side rollers (10) abut the side surfaces of the wheels so as to prevent them from moving in the direction in which the flask is transported. The side rollers are preferably configured so that their surfaces that contact the wheels are formed as arcs.

4 Claims, 9 Drawing Sheets

(51) Int. Cl.
*B29C 31/00* (2006.01)
*B22C 17/08* (2006.01)

(58) Field of Classification Search
USPC .................................................. 425/435, 453
See application file for complete search history.

(56) References Cited

FOREIGN PATENT DOCUMENTS

| | | |
|---|---|---|
| CN | 202639243 U | 1/2013 |
| CN | 104226967 A | 12/2014 |
| DE | 103 824 | 2/1974 |
| JP | 46-12619 | 4/1971 |
| JP | 11-290993 | 10/1999 |
| JP | 2007-301608 | 11/2007 |
| JP | 2009-214125 A | 9/2009 |
| JP | 2010-023058 | 2/2010 |
| JP | 2010023058 A * | 2/2010 |

OTHER PUBLICATIONS

Supplementary European Search Report dated Feb. 4, 2019, issued by the European Patent Office in European Application No. 16830145.5 (10 pages).

International Search Report issued by the Japan Patent Office in corresponding International Application No. PCT/JP2016/065397, dated Aug. 2, 2016.

\* cited by examiner (prior art)

DEVICE FOR TURNING OVER MOLDS

TECHNICAL FIELD

The present invention relates to a device for turning over molds. The device is used in a line for tight flask molding in an automatic casting plant.

BACKGROUND ART

In a line for tight flask molding, molds that are molded within flasks have cavities that face downward. Both the upper flask and the lower flask are turned over by means of a device for turning over the molds so that the cavities face upward. The upper mold is subject to operations such as scraping sand on the surface that is opposite the cavity, or forming a sprue, from underneath. The lower mold is subject to operations such as placing it on a molding board, or setting a core onto it. Then only the upper flask is turned over again by the device for turning over the molds, so that the cavity faces downward to be assembled on the lower flask. Thus conventionally a device for turning over the molds as in Patent Literature 1 has been used.

FIGS. 8 and 9 show a structure of a conventional device for turning over molds. As in FIG. 8, the device 101 is located on the middle of a conveyor 102 with stationary rollers. It has a turning over roller conveyor 104 that turns over a metal flask 103 on it and a pair of turning over wheels 105 that are attached to respective sides of the turning over roller conveyor 104. The outer surfaces of the pair of the turning over wheels 105 are supported by two pairs of supporting rollers 106 with flanges. A driving roller 109 is provided on one or both of the turning over wheels 105 so as to turn over both the turning over wheels 105 and the turning over roller conveyor 104.

Since the cycle time of the conventional line for tight flask molding is long, the flasks are slowly transported. Thus no serious problem has been generated by the device 101 for turning over the molds. However, in a recent line for tight flask molding, the cycle time has been shortened and the flasks are transported at a high speed. Because of the reaction caused by the transportation at the high speed, the turning over wheels 105 that are attached to the turning over roller conveyor 104 tend to move downstream. Thus the sides of the turning over wheels 105 and the flange of the supporting rollers 106 are quickly worn away.

As the cycle time is shorter, the speed for turning over a flask has increased. The tread surfaces of the pair of the turning over wheels 105 and those of the supporting rollers 106 with flanges are quickly worn away. This is a problem. To solve this problem, scrapers 111 for cleaning the tread surface are provided as in FIG. 9. However, they are fixed types. After they are worn away the effect for cleaning cannot be maintained. Thus frequent maintenance is required.

Further, since the device 101 for turning over the molds usually holds the flask 103 in it, the turning over wheels 105 cannot be easily replaced. The cost of the turning over wheels 105 is also high. An approach to enhance the resistance to wear of the turning over wheels 105 by changing the raw material or by means of a heat treatment may cause a significant increase in cost.

The present invention aims to solve the above-mentioned problems by providing a device for turning over molds that can reduce the wear of a turning over wheel and a supporting roller even when the speed for transporting a flask or the speed for turning it over increases to shorten the cycle time.

PRIOR-ART PUBLICATION

Patent Publication

Patent Publication 1. JP2007-301608A

SUMMARY OF INVENTION

By a device for turning over the molds of a first aspect of the present invention, which invention was conceived to solve the above problems, a pair of turning over wheels are attached to respective sides of a turning over roller conveyor, on which a metal flask is mounted, outer surfaces of the pair of turning over wheels are supported by means of respective pairs of supporting rollers, and a driving roller is provided on one or both of the turning over wheels. The device is characterized in that the supporting rollers are configured with no flange, and two pairs of side rollers abut side surfaces of the turning over wheels so as to prevent the turning over wheels from moving in a direction in which the metal flask is transported.

As in a second aspect of the invention, the side rollers are preferably configured so that their surfaces that contact side surfaces of the turning over wheels are formed as arcs. As in a third aspect of the invention, scrapers for cleaning tread surfaces are preferably provided at respective positions to contact the tread surfaces of the turning over wheels, wherein a scraper, which is propelled by a spring, is housed in each bracket of the scrapers for cleaning the tread surfaces.

By the device for turning over the molds of the present invention the two pair of the supporting rollers, which support the outer surfaces of the pair of the turning over wheels, are configured with no flange, and the two pairs of the side rollers abut the side surfaces of the turning over wheels. Thus a conventional problem wherein the flanges of the supporting rollers are quickly worn away can be solved. The side rollers are provided instead of the flanges. Thus the turning over wheels are prevented from moving in the direction in which the flask is transported.

By the second aspect the surfaces that contact the side surfaces of the turning over wheels are formed as arcs, and thereby they contact each other only at respective points. Thus wear caused by rubbing against each other can be prevented. By the third aspect the scrapers for cleaning the tread surface, wherein a scraper, which is propelled by a spring, is housed in a bracket, are provided at respective positions to contact the tread surfaces of the turning over wheels. Thus the tread surfaces of the turning over wheels are always kept clean without frequent maintenance. Wear of the turning over wheels can be prevented.

The basic Japanese patent application, No. 2015-148727, filed Jul. 28, 2015, is hereby incorporated by reference in its entirety in the present application.

The present invention will become more fully understood from the detailed description given below. However, the detailed description and the specific embodiments are only illustrations of the desired embodiments of the present invention, and so are given only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present invention in the sense of the doctrine of equivalents.

The use of the articles "a," "an," and "the" and similar referents in the specification and claims are to be construed to cover both the singular and the plural form of a noun, unless otherwise indicated herein or clearly contradicted by the context. The use of any and all examples, or exemplary language (e.g., "such as") provided herein is intended merely to better illuminate the invention, and so does not limit the scope of the invention, unless otherwise stated.

DESCRIPTION OF EMBODIMENTS

Figure 1:
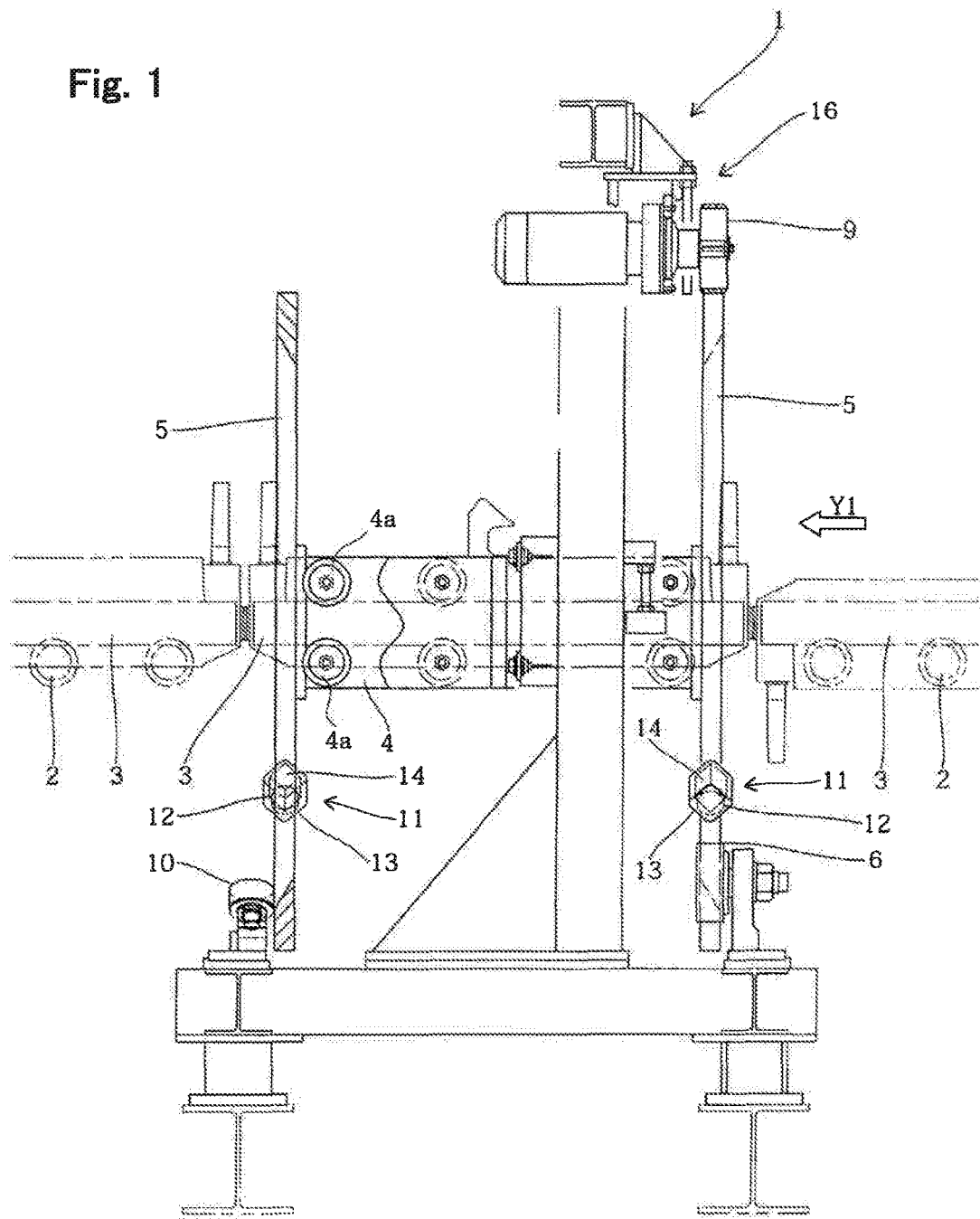
FIG. 1 is a partially-sectional front view of an embodiment of the present invention.

Below, the embodiments of the present invention are discussed. In FIG. 1 the reference number "1" denotes a device for turning over the molds of the present invention. The device is used in the line for tight flask molding so as to turn over a mold that has been molded within a metal flask and has been transported to the device. The device repeats normal and reverse rotations at 180° to turn over the molds. The reference number "2" denotes a conveyor with stationary rollers that transports a metal flask 3. The reference number "4" denotes a turning over roller conveyor that is located in the middle of the conveyor 2 with stationary rollers. The arrow Y1 denotes the direction in which the metal flask 3 is transported.

The turning over roller conveyor 4 causes one metal flask 3 to be mounted on it to turn over the metal flask 3. At both the front and the end of it ring-shaped turning over wheels 5 are provided. The turning over roller conveyor 4 is fixed to the turning over wheels 5 so as to be turned over together with the turning over wheels 5. The metal flask 3 is transported from the conveyor 2 with the stationary rollers through the center hole of one of the turning over wheels 5 to the turning over roller conveyor 4. The metal flask 3 is transported between a pair of rollers with flanges 4a that are located at the upper and lower parts of the turning over roller conveyor 4.

Figure 2:
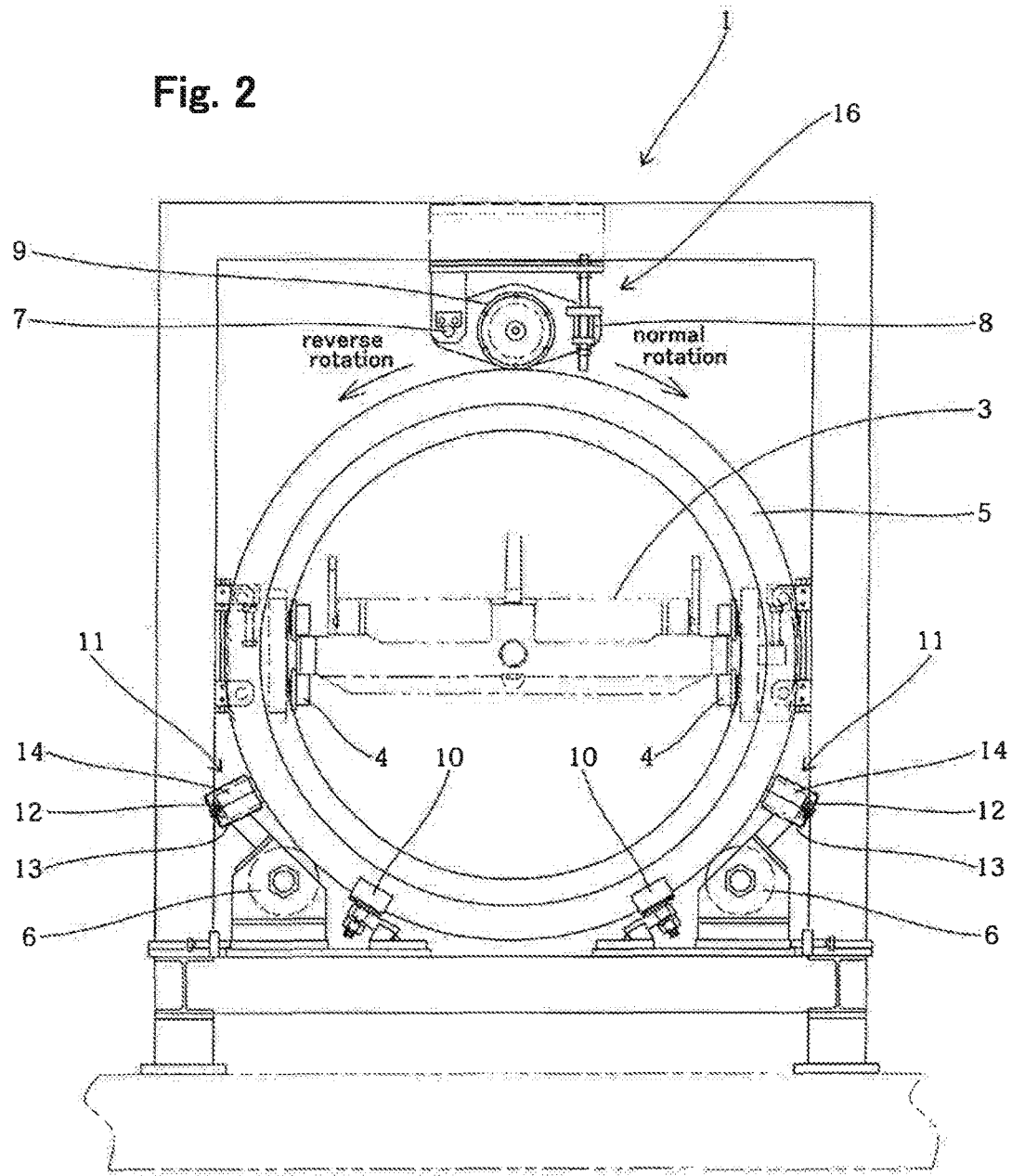
FIG. 2 is a side view of the embodiment of the present invention.

As in FIG. 2, each of the turning over wheels 5 is supported by respective pairs of the supporting rollers 6. These supporting rollers 6 are flangeless. That is, they differ from the conventional type. They support two points on the lower part of the tread surface of each turning over wheel 5.

Since the supporting rollers 6 are flangeless, the positions of the turning over wheels 5 in the direction Y1, in which direction the metal flask is transported (see FIG. 1) are not set by flanges. Thus by the present invention two pairs of side rollers 10 abut the side surfaces of each of the turning over wheels 5 as in FIGS. 1 and 2 to prevent the turning over wheels 5 from moving in the direction Y1, in which direction the metal flask is transported. Here, the movement in the direction Y1, in which direction the metal flask is transported, means both a movement in the direction Y1 and a movement in the reverse direction of the direction Y1. The side rollers 10 are located at the inner sides of the supporting rollers 6 (see FIG. 2). They are located outside the turning over wheels 5 in FIG. 1 (there are two pairs, thus in total four rollers. The rollers on the reverse side are omitted). By this configuration any movement of the turning over wheels 5 is prevented in the direction Y1, in which direction the metal flask is transported. Further, when a metal flask is transported at a high speed, the turning over wheels 5 are definitely prevented from moving downstream.

Figure 3:
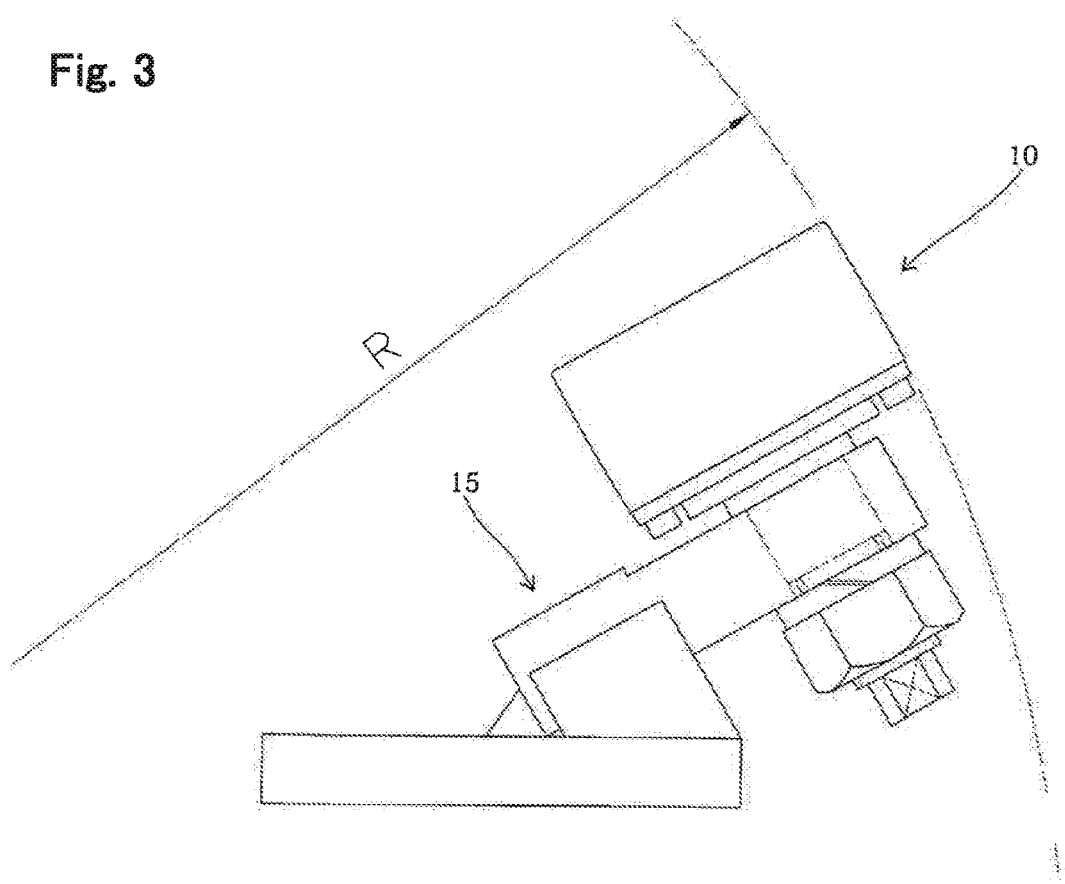
FIG. 3 is an enlarged side view of the side roller.

FIG. 3 is an enlarged side view of one of the side rollers 10. As shown, the side roller 10 is attached so as to be inclined by means of a bracket 15. The side rollers 10 rotate when the turning over wheels 5 rotate either in the normal direction or in the reverse direction. The surfaces of the side rollers 10 are formed as arcs with a large radius R. They contact the side surfaces of the turning over wheels 5 at respective points. If the supporting rollers were flanged types, the flanges would rotate at a speed that differs from that of the turning over wheels 5 even when the supporting rollers rotate. Thus they would rub against each other to cause wear. However, the supporting rollers 6 are configured as flangeless to prevent differential movements of the side rollers 10 and the turning over wheels 5. No flanges of the supporting rollers contact the turning over wheels 5. Further, the side rollers 10 contact the turning over wheels 5 at respective points. Thus they are prevented from rubbing against each other. By this configuration wear caused by rubbing against each other can be prevented.

On the upper part of the turning over wheel 5 a driving roller 9 is provided. One end of a bracket 16 for the driving roller 9 is pivotally supported by a pin 7. The other end of it is propelled by a spring 8 toward the tread surface of the turning over wheel 5. Thus the driving roller 9 is always pressed against the tread surface of the turning over wheel 5 so as to rotate the turning over wheel 5 in a normal or reverse direction. In this embodiment, the driving roller 9 is provided on the upper part of only one turning over wheel 5. However, the driving rollers 9 can be provided on the upper parts of both turning over wheels 5.

The turning over roller conveyor 4 is fixed to the turning over wheels 5. Thus, when the turning over wheels 5 are turned over by means of the driving roller 9, the turning over roller conveyor 4, on which the metal flask 3 is mounted, is turned over so as to turn the metal flask 3 upside down.

On the outer surface of the supporting roller 6 (see FIG. 2), a scraper 11 for cleaning the tread surface of the turning over wheel 5 is provided at an angle of 45° to the vertical plane. As in FIG. 2, the scraper 11 for cleaning the tread surface is formed by housing a rectangular scraper 14 and a spring 12 for pressing the scraper in a rectangular bracket 13 that is made of a rectangular pipe. The rectangular scraper 14 is always pressed against the tread surface of the turning over wheel 5 by means of the spring 12, to clean the tread surface. Because of this configuration, foreign matter that adheres to the tread surface of the turning over wheel 5 can be removed without the frequent maintenance that was conventionally carried out. Thus the wear of the turning over wheels 5 and the supporting rollers 6 can be reduced in this embodiment the scraper 11 for cleaning the tread surface is disposed at an angle of 45° to the vertical plane. But that angle can be changed at need. The scraper 11 for cleaning the tread surface is described as housing the rectangular scraper 14 in the rectangular bracket 13. But the shapes of the bracket and the scraper are not limited to a rectangular shape, but may be any practical shapes. The bracket is not necessarily made of a rectangular pipe.

Figure 4:
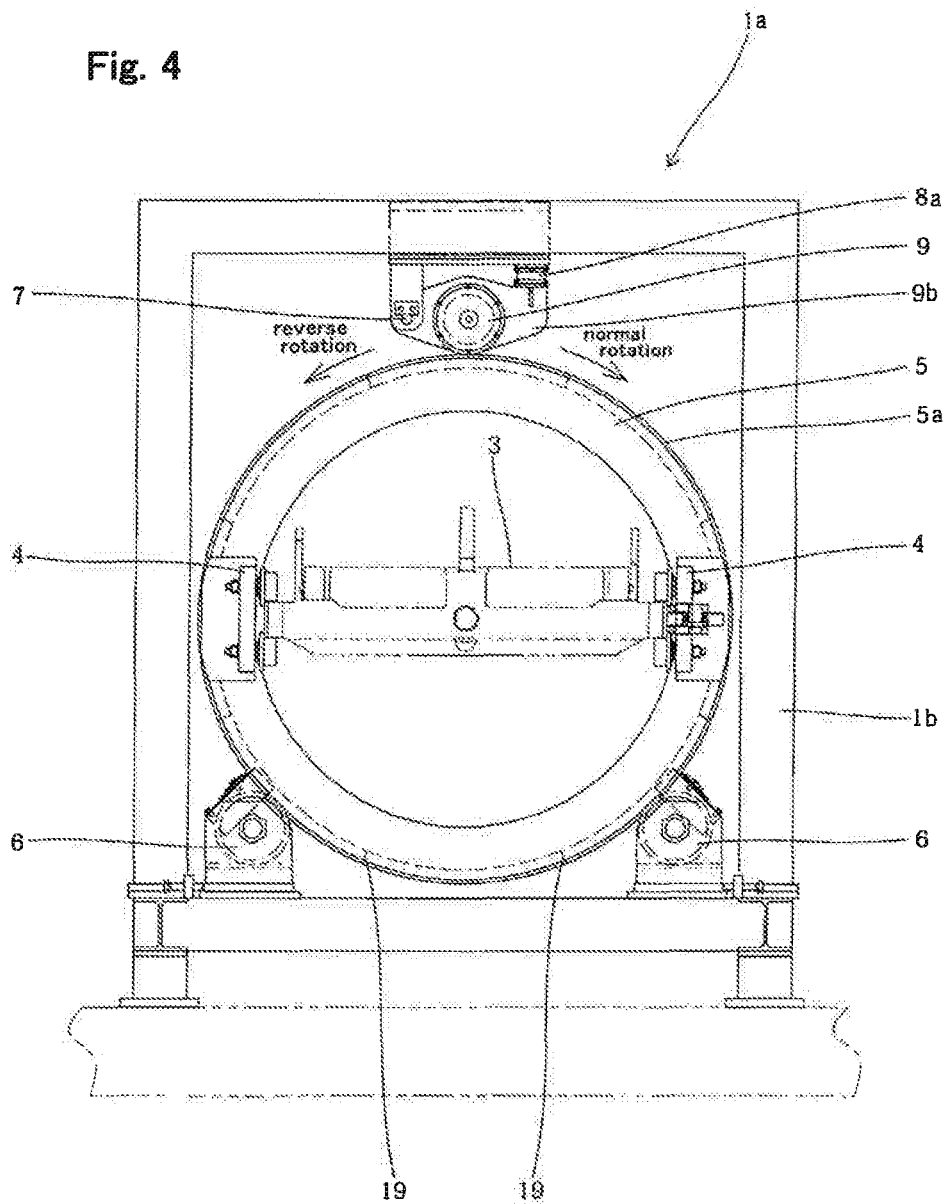
FIG. 4 is a side view of another embodiment of the present invention.
Figure 5:
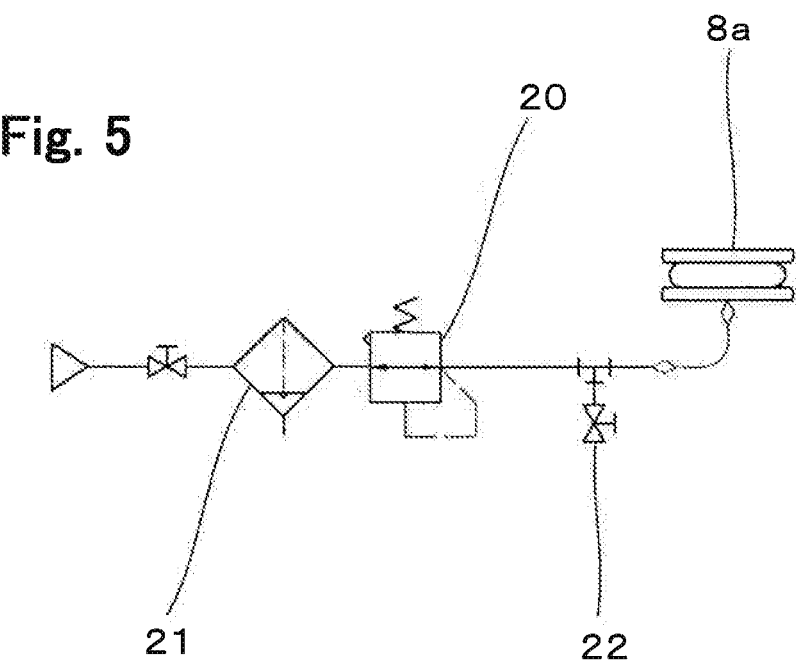
FIG. 5 is a chart of the system of the pneumatic piping for an air cushion.

Now, with reference to FIGS. 4 and 5, a device 1a for turning over the molds is discussed. By the device 1a localized wear of the turning over wheel 5 can be prevented by adjusting the force to press the driving roller 9 against the turning over wheel 5.

The driving roller 9 rotates in the normal direction and in the reverse direction by means of a motor 9a. One end of a bracket 9b for the driving roller 9 is pivotally attached to a frame 1b by means of a pin 7. The other end of the bracket 9b is attached to the frame 1b through an air cushion 8a. Thus by adjusting the inner pressure of the air cushion 8a the pressing force is changed. Thus the force of the driving roller 9 to press against the tread surface of the turning over wheel 5 can be discretionarily set. By the present embodiment, as in FIG. 5, a precisely acting reducing valve 20 is provided to the system of the pneumatic piping to the air cushion 8a so that the force for pressing by the air cushion 8a can be precisely adjusted. Incidentally, the reference number "21" denotes a filter that is provided to the system of the pneumatic piping. The reference number "22" denotes a residual pressure release valve. That is, compressed air from a source of compressed air (not shown) is depressurized by means of the reducing valve 20 and supplied to the air cushion 8a.

Figure 6:
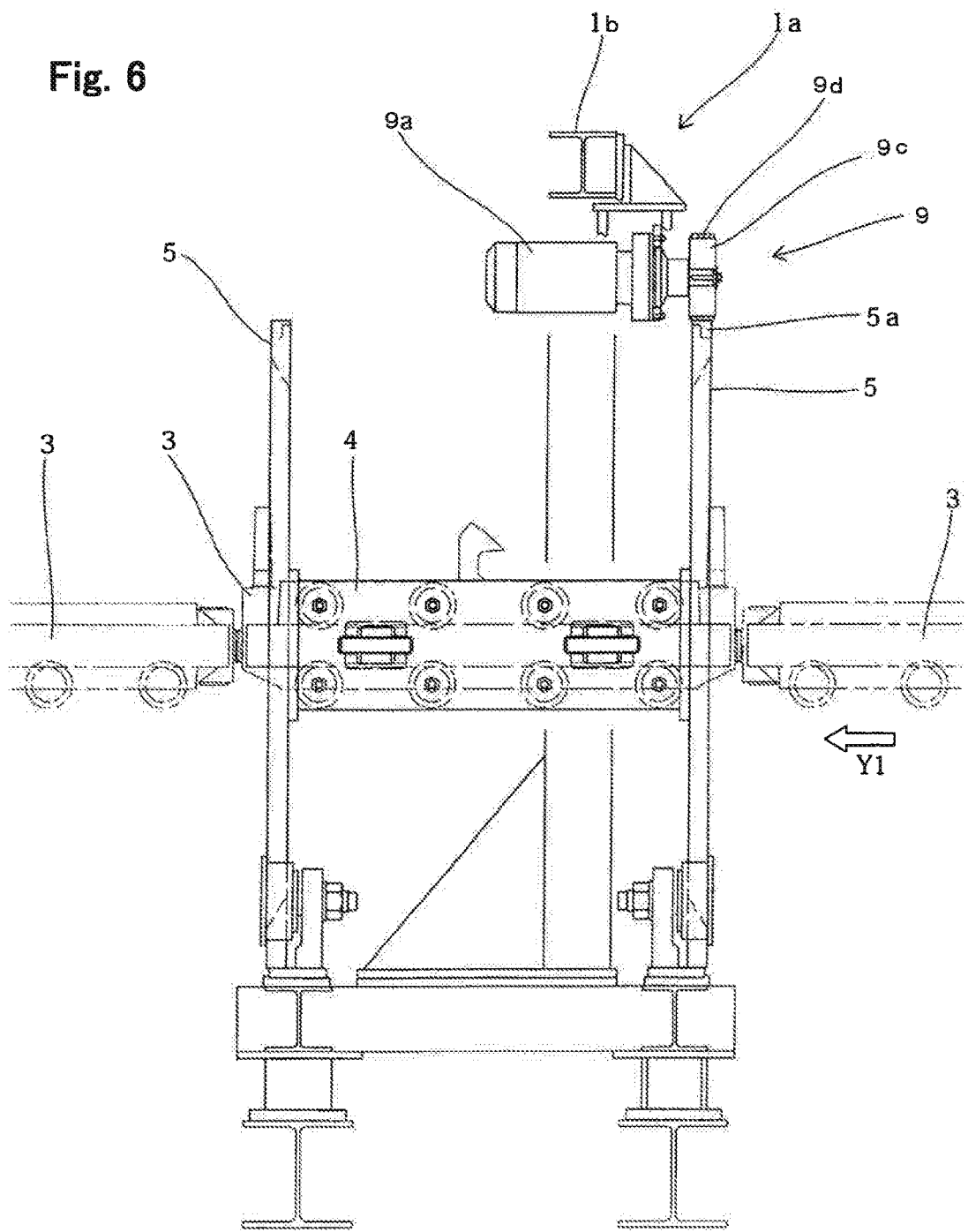
FIG. 6 is a partially-sectional front view of another embodiment of the present invention.

As in FIG. 6, the driving roller 9 is formed as follows: Special rubber 9d (rubber having a high elastic modulus, a high friction factor, and a high resistance to friction, such as polyurethane rubber) is burned in a metal base 9c to adhere to it. If the force by the driving roller 9 to press were too strong, the rubber 9d that has been burned in the metal base 9 would disadvantageously exfoliate. On the contrary, if the force were too weak, the driving roller 9 would slip when accelerating or decelerating or stopping, so that the turning over wheel 5 would disadvantageously suffer from localized friction, to cause wear. However by the present embodiment, the driving roller 9 is configured to press against the turning over wheel 5 by means of the air cushion 8a. Further, the pressing force of the air cushion 8a can be precisely adjusted. Thus the driving roller 9 always drives the turning over wheel 5 at a stable force. Thus conventional defects, such as the exfoliating of the special rubber 9d or localized wear of the turning over wheel 5, can be prevented.

Figure 7:
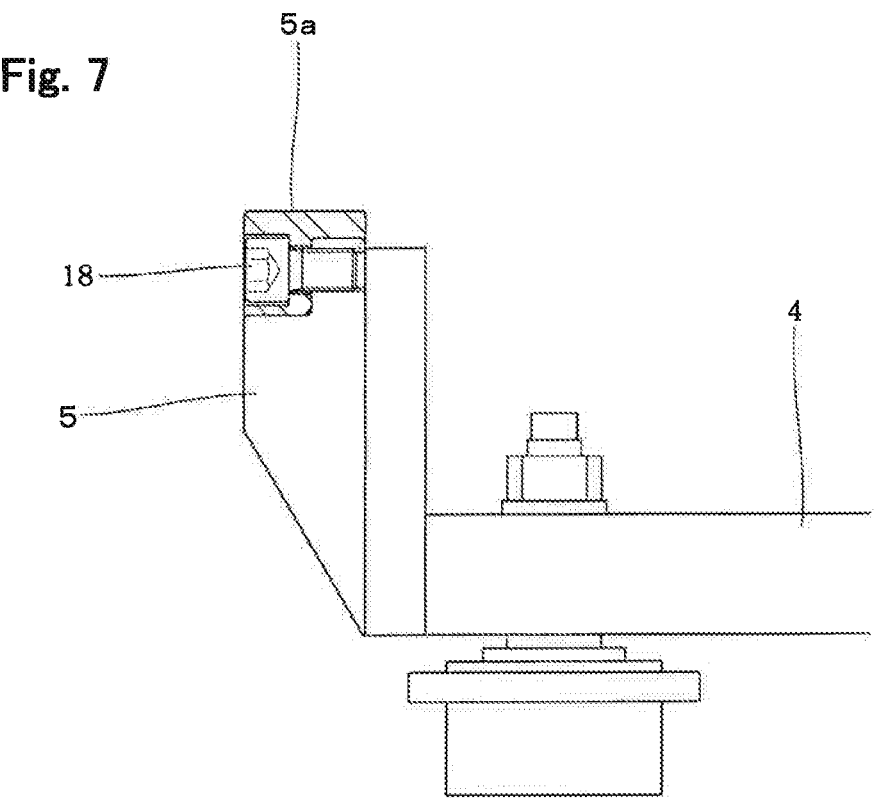
FIG. 7 is an enlarged sectional view of a part for attaching a liner of the turning over wheels.
Figure 8:
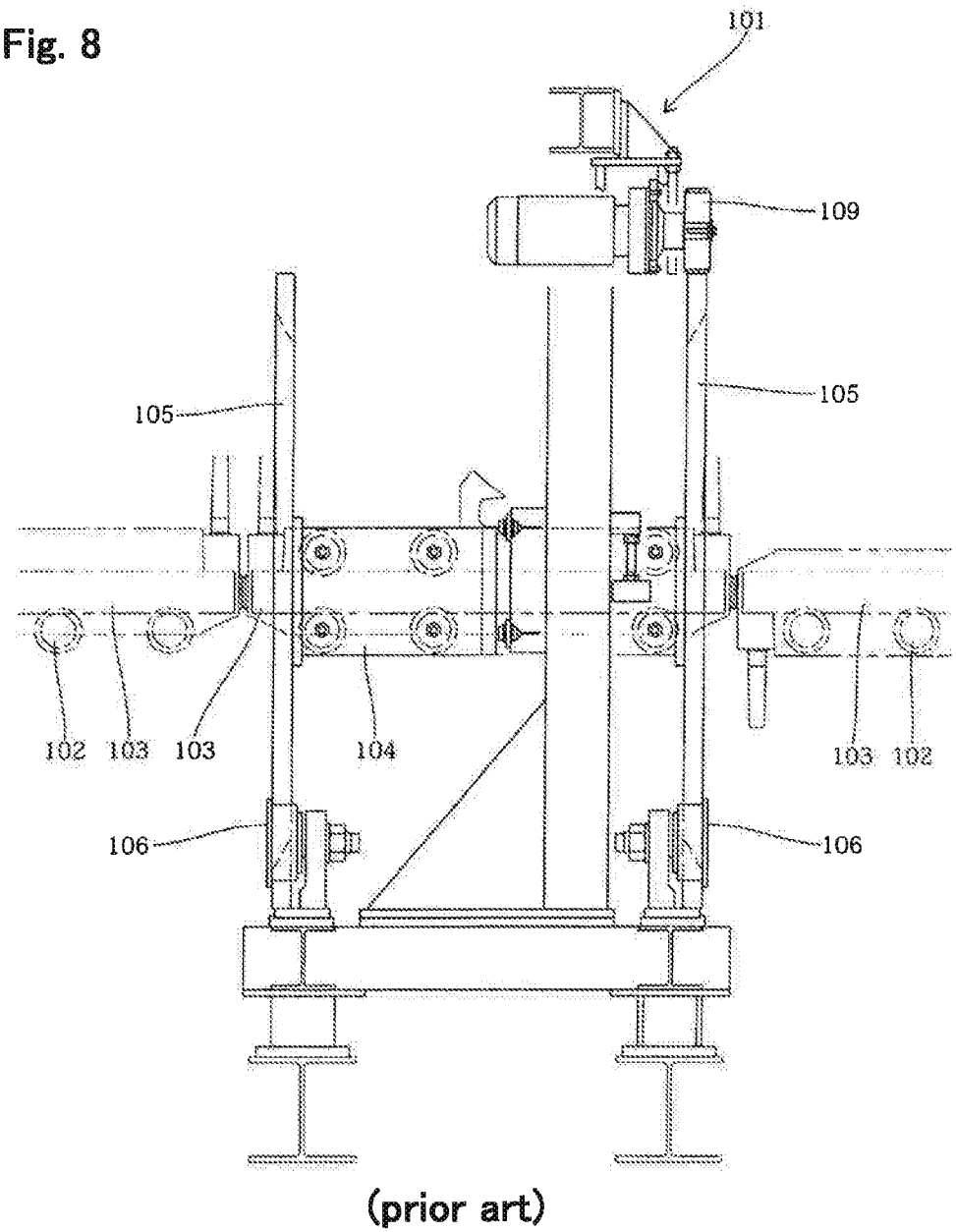
FIG. 8 is a front view of a conventional device for turning over the molds.
Figure 9:
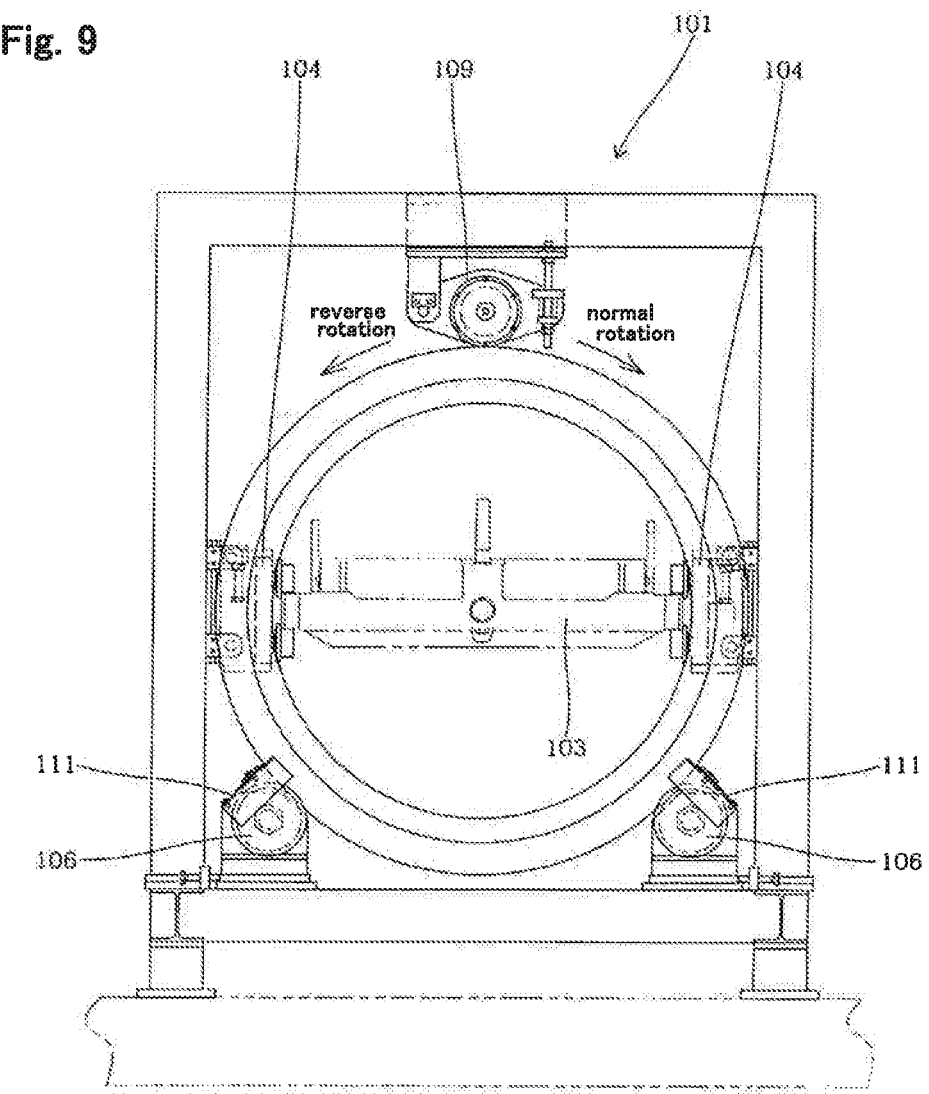
FIG. 9 is a side view of the conventional device for turning over the molds.

As in FIG. 7, the surface of the turning over wheel 5 that contacts the supporting rollers 6 is made of a replaceable liner 5a that can be attached from the side by means of a bolt 18. As in FIG. 4, the liner 5a is divided into arc-shaped parts (the reference number "19" in FIG. 4 denotes the divided surface). Thus, if localized wear occurs, no turning over wheel 5 needs to be replaced as a whole. While the metal flask 3 is mounted on it, only the liner 5a can be replaced. Thus when localized wear occurs in the turning over wheel 5, only the liner 5a, on which the localized wear occurs, needs to be replaced to repair the turning over wheel 5.

As discussed above, by the device for turning over the molds of the present invention, even when the speed to transport a metal flask or the speed of turning over becomes high because of a shorter cycle time, need for new turning over wheels 5 or new supporting rollers 6 can be advantageously reduced.

The reference numbers used in the present specification and the drawings are as follows:
- 1,1a the device for turning over the molds
- 1b the frame
- 2 the conveyor with stationary rollers
- 3 the metal flask
- 4 the turning over roller conveyor
- 4a the roller with a flange
- 5 the turning over wheels
- 5a the liner
- 6 the supporting rollers
- 7 the pin
- 8 the spring
- 8a the air cushion
- 9 the driving roller
- 9a the motor
- 9b the bracket
- 9c the base
- 9d the special rubber
- 10 the side roller
- 11 the scraper for cleaning the tread surface
- 12 the spring
- 13 the rectangular bracket
- 14 the rectangular scraper
- 15 the bracket
- 16 the bracket
- 18 the bolt
- 19 the divided surface
- 20 the reducing valve
- 21 the filter
- 22 the residual pressure release valve
- 101 the device for turning over the molds
- 102 the conveyor with stationary rollers
- 103 the metal flask
- 104 the turning over roller conveyor
- 105 the turning over wheels
- 106 the supporting rollers with flanges
- 109 the driving roller
- 111 the scraper for cleaning the tread surface

The invention claimed is:

1. A device for turning over molds, wherein a pair of turning over wheels are attached to respective sides of a turning over roller conveyor, on which a metal flask is mounted, wherein outer surfaces of the pair of turning over wheels are supported by means of respective pairs of supporting rollers, and wherein a driving roller is provided on one or both of the turning over wheels, the device being characterized in that the supporting rollers are configured with no flange, and two pairs of side rollers abut side surfaces of the turning over wheels so as to prevent the turning over wheels from moving in a direction in which the metal flask is transported.

2. The device for turning over molds of claim 1, wherein scrapers for cleaning tread surfaces are provided at respective positions to contact the tread surfaces of the turning over wheels, wherein a scraper, which is propelled by a spring, is housed in a bracket of each of the scrapers for cleaning tread surfaces.

3. The device for turning over molds of claim 1, wherein the side rollers are configured so that their surfaces that contact side surfaces of the turning over wheels are formed as arcs.

4. The device for turning over molds of claim 3, wherein scrapers for cleaning tread surfaces are provided at respective positions to contact the tread surfaces of the turning over wheels, wherein a scraper, which is propelled by a spring, is housed in a bracket of each of the scrapers for cleaning tread surfaces.

* * * * *